United States Patent [19]

Rice

[11] 4,347,399
[45] Aug. 31, 1982

[54] ISOMERIZATION OF NORMAL BUTANE

[75] Inventor: Lynn H. Rice, Palatine, Ill.

[73] Assignee: UOP Inc., Des Plaines, Ill.

[21] Appl. No.: 270,054

[22] Filed: Jun. 3, 1981

[51] Int. Cl.³ .............................................. C07C 5/13
[52] U.S. Cl. .................................... 585/738; 585/751
[58] Field of Search ................................ 585/738, 751

[56] References Cited

U.S. PATENT DOCUMENTS

| 2,999,074 | 9/1961 | Bloch et al. | 252/442 |
| 3,112,351 | 11/1963 | Hoekstra | 585/748 |
| 3,128,319 | 4/1964 | Meisinger et al. | 585/734 |
| 3,527,715 | 9/1970 | Giannetti et al. | 252/415 |
| 3,649,704 | 3/1972 | Hayes | 585/482 |
| 3,652,697 | 3/1972 | Hayes | 585/482 |
| 3,789,082 | 1/1974 | Cook et al. | 585/748 |

Primary Examiner—Curtis R. Davis
Attorney, Agent, or Firm—James R. Hoatson, Jr.; Robert W. Welch; William H. Page, II

[57] ABSTRACT

A process for the isomerization of normal butanes is disclosed. Product isobutane and unreacted normal butane are recovered from the reactor effluent in a stabilizer column. The stabilizer overhead comprising light hydrocarbon by-products and residual hydrogen and isobutane is further treated in a refrigerated gas-liquid separator, the isobutane liquid phase being subsequently treated in a stripper column for the recovery of substantially pure isobutane. The stripper column overhead is recycled to the refrigerated gas-liquid separator for the further recovery of isobutane.

6 Claims, 1 Drawing Figure

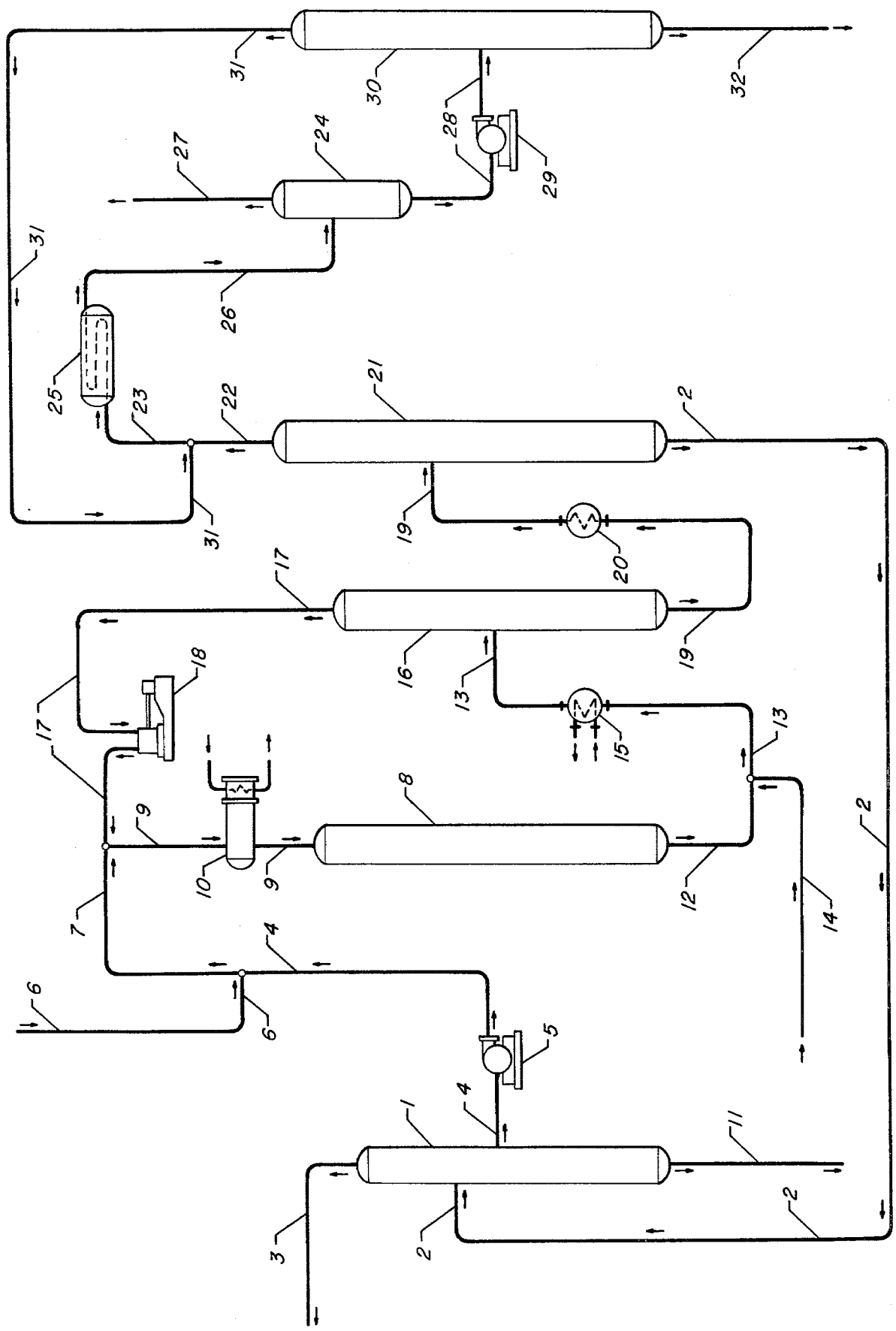

ISOMERIZATION OF NORMAL BUTANE

The catalytic isomerization of normal butane has proven to be a useful tool for the petroleum refining industry over the past several years. The isobutane isomerization product is in particular demand for alkylation with light olefinic hydrocarbons such as ethylene, propylene, butylenes and amylenes, to provide higher molecular weight isoparaffinic hydrocarbons in the gasoline boiling range. These higher molecular weight hydrocarbons, commonly referred to as alkylate, are high in octane value and useful as a motor fuel or as a motor fuel blending agent.

Feedstocks available to the isomerization process typically comprise a mixture of butanes, and the feedstock is initially enriched with respect to normal butane by means of a deisobutanizer column, or an isostripper column. The normal butane-enriched feedstock is then admixed with a small amount of hydrogen to suppress coke deposition on the isomerization catalyst, and the mixture is then treated at isomerization conditions in contact with an acid-acting isomerization catalyst. The catalyst, disposed as a fixed bed in a reactor, is usually promoted by a small amount of organic halide added to the reactor feed.

The overall process flow scheme will generally further include a gas-liquid separator for the separation and recovery of recycle hydrogen from the reactor effluent, a recycle gas compressor, a stabilizer column for the recovery of butanes, and a stripper column. Stabilizer column bottoms, comprising isobutane and unreacted normal butane, are returned to the deisobutanizer column for the recovery of isobutane, the unreacted isobutane being recycled to the isomerization reactor. The overhead from the stabilizer column comprises residual hydrogen and isobutane not otherwise recovered, and also the light hydrocarbon by-products of the isomerization process, e.g., methane and ethane. This overhead is treated in the stripper column for the recovery of said isobutane. The isomerization of normal paraffins is described in U.S. Pat. Nos. 2,999,074; 3,112,351; 3,128,319; 3,527,715 (Cl. 252-415); 3,649,704 (Cl. 260-668A); 3,652,697 (Cl. 260-668A); and 3,789,082 (Cl. 260-683.68).

It will be appreciated that as the demand for isobutane continues to grow and isobutane units of higher capacity are required, the increasing value of isobutane makes it highly desirable to effect an improved recovery of said residual isobutane. It is therefore an object of this invention to present an improved process for the isomerization of normal butane. It is a more specific object to present a process for the isomerization of normal butane providing for the improved recovery of isobutane.

In one of its broad aspects, the present invention embodies a process for the isomerization of normal butane which comprises the steps of: (a) introducing a hydrocarbon feed stream comprising mixed butanes into a first separation zone at conditions to produce an isobutane stream and a normal butane stream; (b) separating the isobutane stream and passing the normal butane stream into a catalyst-containing isomerization zone in admixture with hydrogen, said isomerization zone being maintained at isomerization reaction conditions; (c) passing the effluent stream from the isomerization zone into a second separation zone at conditions to produce a hydrogen-rich vapor phase and a liquid hydrocarbon phase comprising isobutane, unreacted normal butane, and $C_4$-hydrocarbon by-products; (d) recycling the hydrogen-rich vapor phase to said isomerization zone; (e) recovering and introducing the hydrocarbon phase into a third separation zone at conditions to produce a butane stream and a $C_4$-hydrocarbon by-product stream containing residual hydrogen and isobutane; (f) returning said butane stream to said first separation zone for the recovery of isobutane, and recycling unreacted normal butane to said isomerization zone; (g) passing said by-product stream into a refrigerated fourth separation zone at conditions to provide a hydrogen-rich by-product stream and a liquefied stream comprising isobutane; (h) separating and recovering the hydrogen-rich by-product stream, and introducing the refrigerated isobutane stream into a fifth separation zone at conditions to separate a vapor phase comprising substantially all of the residual hydrogen and by-products contained therein; and, (i) recycling said vapor phase to said refrigerated fourth separation zone, and recovering the liquid isobutane stream from said fifth separation zone.

Other objects and embodiments of this invention will become apparent in the following detailed specification.

Feedstocks available to the isomerization process herein contemplated typically comprise a mixture of iso- and normal butanes, commonly referred to as field butanes, recovered as a product or by-product of various hydrocarbon conversion processes. Pursuant to the present process, the mixed butanes are introduced into a first separation zone at conditions to produce an isobutane stream and a normal butane stream. This first separation zone is suitably a fractionation column, more often referred to as an isostripper or a deisobutanizer column. Preferably, the column is operated at a pressure of from about 75 to about 100 psig and at a bottom temperature of about 160° to about 180° F.

The normal butane stream recovered from the first separation zone is treated in a catalyst-containing isomerization zone at isomerization conditions familiar to those skilled in the art. It is the usual practice to pass the normal butane feedstock downflow through a vertical isomerization reactor containing a fixed bed of catalyst, the normal butane feedstock being charged to the reactor in admixture with from about 0.1 to about 10 moles of hydrogen per mole of normal butane. Isomerization temperatures up to about 500° F. promote favorable equilibrium conditions, a temperature of from about 300° to about 450° F. being generally preferred. It is further preferred that the combined feed be charged to the isomerization reactor at a liquid hourly space velocity of from about 5 to about 10, although liquid hourly space velocities in the range of from about 0.1 to about 12 are suitably employed. In any case, the effluent from the isomerization reactor is condensed at a temperature of from about 100° to about 150° F. and transferred to a second separation zone, or separator, for the recovery of recycle hydrogen. Pressures are not considered to be a critical factor with respect to the isomerization reaction, and pressures ranging from about 50 to about 600 psig are suitable. As a practical matter, a pressure in the higher range is more suitable to the overall process as it facilitates the subsequent separation of hydrogen from the isomerization reaction mixture. A pressure of from about 350 to about 450 psig is preferred with respect to the process of the present invention, and the subsequent separator is operated at substantially the same pressure allowing for a pressure drop of from about 25 to about 75 psig.

The overall process flow scheme will further include a third separation zone, usually a fractionation or a stabilizer column, for the separation of lower boiling hydrocarbon by-products from the separator liquid phase. The stabilizer column is generally operated at a pressure of from about 275 to about 350 psig, and at a bottom temperature in the range of from about 175° to about 275° F. sufficient to separate an overhead stream comprising the light hydrocarbon by-products of the isomerization reaction at the selected operating pressure. This overhead stream will invariably further contain hydrogen and a substantial amount of isobutane. In accordance with the process of the present invention, substantially all of the hydrogen and light hydrocarbon by-products are separated from the stabilizer column overhead stream in a refrigerated fourth separation zone. The fourth separation zone is operated at a pressure of from about 250 to about 325 psig and at a temperature of from about −40° to about 50° F. whereby a liquid phase comprising isobutane settles out from a vapor phase comprising hydrogen and the light hydrocarbon by-products. The vapor phase is discharged, and the liquid phase is introduced into a fifth separation zone, for example a stripper column operated at a pressure of from about 300 to about 375 psig, and at a bottom temperature in the range of from about 175° to about 225° F. sufficient to separate an overhead fraction comprising the residual hydrogen and light hydrocarbon by-products contained therein. This overhead stream is then recycled to the refrigerated fourth separation zone for the further recovery of isobutane entrained therein.

Catalysts promoting the isomerization of normal butane preferably comprise a platinum group metal component and a halogen component supported on a refractory inorganic oxide carrier material. The preferred platinum group metal component is platinum, palladium, or a mixture thereof, and said platinum group metal component will usually comprise less than about 2 wt. %, and preferably from about 0.05 to about 1 wt. % of the catalyst. The halogen component, i.e., chlorine, bromine, fluorine, iodine, or mixtures thereof, is typically present in an amount of from about 0.01 to about 5 wt. %. In general, the refractory inorganic oxide carrier material is a porous, high surface area material. Naturally occurring materials, for example clays and silicates, are suitably employed, and said material may or may not be activated prior to use by one or more treatments including drying, calcining, steaming and/or acid treatment. Synthetically prepared refractory inorganic oxides like alumina, silica, zirconia, boria, magnesia, titania, chromia, or mixtures thereof, are also suitably employed. Alumina is a preferred carrier material, and the alumina may be any of the various hydrous aluminum oxides or alumina gels including alpha-alumina monohydrate (boehmite), alpha-alumina trihydrate (gibbsite), beta-alumina trihydrate (bayerite), and the like. Activated aluminas, such as have been thermally treated to eliminate substantially all of the water and/or hydroxyl groups commonly associated therewith, are particularly useful. Preferably, the alumina is an activated alumina with a surface area of from about 50 to about 500 m$^2$/g, especially gamma-alumina and eta-alumina resulting from the thermal treatment of boehmite alumina and bayerite alumina, respectively, generally at a temperature of from about 750° to about 1500° F.

A particularly preferred method for the production of an isomerization catalyst is presented in U.S. Pat. No. 2,999,074. The carrier material and the platinum group component are composited and the resulting material is mildly calcined. This calcination is normally carried out under carefully controlled conditions to remove physically adsorbed solvents such as water but to retain some chemically combined hydroxyl groups on the surface of the catalyst. Temperatures ranging from 350° to about 700° C. are usually satisfactory. The calcined composite is then reacted with a metal halide of the Friedel-Crafts type. Suitable metal halides include aluminum chloride, aluminum bromide, ferric chloride and zinc chloride, etc. Of these, aluminum chloride is particularly preferred.

Recently developed isomerization catalysts are of a bimetallic or trimetallic nature. An example of this is the catalytic composite comprising a platinum group component, a germanium component, and a Friedel-Crafts metal halide component shown in U.S. Pat. No. 3,649,704. In U.S. Pat. No. 3,652,697, there is disclosed a trimetallic catalyst comprising a platinum group component, a germanium component, a rhenium component and a Friedel-Crafts metal halide component.

The net hydrocarbon effluent of the isomerization zone is a mixture of isobutane and normal butane. This stream is passed into the isostripper or into the deisobutanizer if it is present. Substantially all of the isobutane which enters the isostripper or the deisobutanizer is concentrated into a net overhead stream and eventually passed into the alkylation zone.

The further description of the process of this invention is presented with reference to the attached schematic drawing. The drawing represents one preferred embodiment of the invention and is not intended as an undue limitation on the generally broad scope of the invention as set out in the appended claims. Miscellaneous hardware such as certain pumps, compressors, condensers, heat exchangers, coolers, valves, instrumentation and controls have been omitted or reduced in number as not essential to a clear understanding of the invention, the utilization of such hardware being well within the purview of one skilled in the art.

In the drawing, there is shown a deisobutanizer column 1, an isomerization reactor 8, a gas-liquid separator 16, a stabilizer column 21, a refrigeration means 25, a refrigerated gas-liquid separator 24, and a stripper column 30. A butanes stream comprising iso- and normal butanes is introduced into the deisobutanizer column 1 from line 2, said butanes stream having been recovered from the stabilizer column 21 by way of line 2 as hereinafter related. In this calculated example, the deisobutanizer column 1 is operated at a bottom temperature of about 170° and at a top temperature of about 130° F.; the column pressure ranging from about 90 to about 100 psig whereby an isobutane product stream is recovered through an overhead line 3. A normal butanes stream is withdrawn as a sidecut from the deisobutanizer column 1 via line 4, and this normal butane stream is increased in pressure to about 450 psig by means of pump 5. The normal butanes stream is then admixed with a fresh butanes feedstock from line 6, and the mixture is continued through line 7. Recycle hydrogen from line 17, originating as hereinafter described, is combined with a butanes stream from line 7, and the combined stream, with a hydrogen/hydrocarbon mole ratio of about 0.5, enters the isomerization reactor 8 by way of line 9; the combined stream being increased in temperature by a heat exchange means 10 to enter the isomerization reactor 8 at a temperature of about 425° F. and at a pressure of about 415 psig. Higher boiling $C_4+$ hydrocarbons are recovered from the deisobutanizer column 1 by way of line 11 and discharged from the isomerization process.

The isomerization reactor 8 contains a fixed bed of an acid-acting platinum-containing catalyst, and the combined stream from line 9 is introduced into the reactor at a liquid hourly space velocity of about 8. The reactor effluent recovered through line 12 is admixed with make-up hydrogen introduced from an external source via line 14, and this mixture is passed through a cooling means 15 contained in line 13 to enter the gas-liquid separator 16 at a temperature of about 120° F. and at a pressure of about 350 psig. The hydrogen-rich vapor phase, comprising about 67.5 mole percent hydrogen, that forms in the gas-liquid separator 16 is recovered through an overhead line 17 for recycle to the isomerization reactor 8. This recycle stream is processed through the recycle compressor 18 to be combined with the butanes stream from line 7, and the combined stream enters the isomerization reactor 8 by way of line 9 as previously described.

The liquid phase recovered from the gas-liquid separator 16, comprising isobutane and unreacted normal butane as well as some hydrogen and light hydrocarbon by-products of the isomerization reaction, is transferred through line 19 and a heating means 20 to the stabilizer column 21. The stabilizer column is maintained at a pressure of about 300 psig and at a bottom temperature of about 235° F. whereby an overhead stream is recovered through line 22 at a temperature of about 195° F. comprising said hydrocarbon by-products and residual hydrogen and isobutane. The major portion of isobutane is recovered from the bottom of the stabilizer column admixed with unreacted normal butane, and this butanes stream is returned to the deisobutanizer column 1 via line 2 for the recovery of isobutane as heretofore described.

Pursuant to the present invention, the overhead stream recovered from the stabilizer column 21 via line 22 is passed to the refrigerated gas-liquid separator 24 at conditions to provide a hydrogen-rich hydrocarbon by-product stream and a liquid stream comprising isobutane. The overhead stream is introduced into the refrigeration means 25 in admixture with a recycle stream from line 31 originating from the stripper column 30, the mixture passing into the refrigeration means by way of line 23. The refrigerated stream then passes into the refrigerated gas-liquid separator by way of line 26 at a temperature of about 40° F. and at a pressure of about 285 psig. Substantially all of the light hydrocarbon by-products and residual hydrogen are recovered through line 27, and the liquefied isobutane phase is withdrawn through line 26 and pressured into a stripper column 30 by means of a pump 29 at a pressure of about 325 psig. The stripper column 30 is operated at a bottom temperature of about 210° F., and a vapor phase is taken overhead at a temperature of about 160° F. and recycled through line 31 and line 23 to the refrigeration means 25 and then to the gas-liquid separator 24. A substantially pure isobutane stream is recovered from the stripper column 30 via line 32 in improved yields.

The following tabulated data illustrates the calculated composition of certain relevant streams which comprise the process of the above example representing one preferred embodiment of this invention.

| | Line No. | | | | |
|---|---|---|---|---|---|
| | 2 | 3 | 4 | 6 | 9 |
| Component, lb-mols/hr | | | | | |
| $H_2$ | 0.0 | 0.0 | 0.0 | 0.0 | 2,131.6 |
| $C_1$ | 0.0 | 0.0 | 0.0 | 0.0 | 182.3 |
| $C_2$ | 0.0 | 0.0 | 0.0 | 0.0 | 22.9 |
| $C_3$ | 0.0 | 0.0 | 0.0 | 0.0 | 8.9 |
| $iC_4$ | 1,958.4 | 1,827.5 | 130.4 | 69.8 | 652.7 |
| $nC_4$ | 2,037.3 | 56.5 | 1,932.4 | 1,964.9 | 4,243.4 |
| $iC_5$ | 94.7 | 0.0 | 86.1 | 26.7 | 120.6 |
| $nC_5$ | 63.1 | 0.0 | 53.1 | 0.0 | 57.2 |
| Total | 4,153.5 | 1,884.0 | 2,201.9 | 2,061.4 | 7,419.7 |
| Lbs/hr | 243,612 | 109,496 | 129,926 | 120,180 | 305,693 |
| Mol. wt. | 58.7 | 58.1 | 59.0 | 58.3 | 41.2 |
| B.p.s.d. | 28,984 | 13,313 | 15,191 | 14,098 | — |
| $10^6$ s.c.f.d. | — | — | — | — | — |

| | Line No. | | | | |
|---|---|---|---|---|---|
| | 11 | 13 | 14 | 17 | 19 |
| Components, lb-mols/hr | | | | | |
| $H_2$ | 0.0 | 2,207.6 | 111.9 | 2,131.6 | 76.0 |
| $C_1$ | 0.0 | 220.4 | 12.4 | 182.4 | 38.0 |
| $C_2$ | 0.0 | 42.3 | 0.0 | 22.9 | 19.4 |
| $C_3$ | 0.0 | 29.2 | 0.0 | 8.9 | 20.3 |
| $iC_4$ | 0.6 | 2,491.2 | 0.0 | 452.6 | 2,038.7 |
| $nC_4$ | 48.4 | 2,383.5 | 0.0 | 346.2 | 2,037.3 |
| $iC_5$ | 8.6 | 102.5 | 0.0 | 7.8 | 94.7 |
| $nC_5$ | 10.0 | 67.2 | 0.0 | 4.1 | 63.1 |
| Total | 67.6 | 7,543.9 | 124.4 | 3,156.5 | 4,387.3 |
| Lbs/hr | 4,192.2 | 306,105 | 425.2 | 55,588.5 | 250,517 |
| Mol. wt. | 62.0 | 40.6 | 3.4 | 17.6 | 57.1 |
| B.p.s.d. | 480.8 | — | — | — | — |
| $10^6$ s.c.f.d. | — | — | 1.1 | 28.7 | — |

| | Line No. | | | | |
|---|---|---|---|---|---|
| | 22 | 27 | 28 | 31 | 32 |
| Components, lb-mols/hr | | | | | |
| $H_2$ | 76.0 | 76.0 | 1.7 | 1.7 | 0.0 |
| $C_1$ | 38.0 | 38.0 | 7.9 | 7.9 | 0.0 |
| $C_2$ | 19.4 | 19.2 | 19.5 | 19.3 | 0.2 |
| $C_3$ | 20.3 | 9.2 | 31.0 | 19.9 | 11.1 |
| $iC_4$ | 80.3 | 13.5 | 110.0 | 43.2 | 66.8 |
| $nC_4$ | 0.0 | 0.0 | 0.0 | 0.0 | 0.0 |
| $iC_5$ | 0.0 | 0.0 | 0.0 | 0.0 | 0.0 |
| $nC_5$ | 0.0 | 0.0 | 0.0 | 0.0 | 0.0 |
| Total | 233.9 | 155.8 | 170.1 | 92.0 | 78.8 |
| Lbs/hr | 6,904.7 | 2,528.7 | 8,475.8 | 4,099.2 | 4,376.8 |
| Mol. wt. | 29.5 | 16.2 | 49.8 | 44.5 | 56.1 |
| B.p.s.d. | — | — | — | — | 539.5 |
| $10^6$ s.c.f.d. | 2.1 | 1.4 | — | 0.8 | — |

I claim as my invention:

1. A process for the isomerization of normal butane which comprises the steps of:
   (a) introducing a hydrocarbon feed stream comprising mixed butanes into a first separation zone at conditions to produce an isobutane stream and a normal butane stream;
   (b) separating the isobutane steam, and passing the normal butane stream into a catalyst-containing isomerization zone in admixture with hydrogen, said isomerization zone being maintained at isomerization reaction conditions;
   (c) passing the effluent stream from the isomerization zone into a second separation zone at conditions to produce a hydrogen-rich vapor phase and a liquid hydrocarbon phase comprising isobutane, unreacted normal butane, and $C_4$-hydrocarbon by-products;

(d) recycling the hydrogen-rich vapor phase to said isomerization zone;

(e) recovering and introducing the hydrocarbon phase into a third separation zone at conditions to produce a butanes stream and a $C_4$-hydrocarbon by-products stream containing residual hydrogen and isobutane;

(f) returning said butanes stream to said first separation zone for the recovery of isobutane, and recycling unreacted normal butane to said isomerization zone;

(g) passing said by-product stream into a refrigerated fourth separation zone at conditions to provide a hydrogen-rich by-products stream and a liquefied stream comprising isobutane;

(h) separating and recovering the hydrogen-rich by-products stream, and introducing the refrigerated isobutane stream into a fifth separation zone at conditions to separate a vapor phase comprising substantially all of the residual hydrogen and by-products contained therein; and, (i) recycling said vapor phase to said refrigerated fourth separation zone, and recovering the liquefied isobutane stream from said fifth separation zone.

2. The process of claim 1 further characterized with respect to step (b) in that said isomerization reaction conditions include a temperature of from about 300° to about 450° F. and a pressure of from about 350 to about 450 psig.

3. The process of claim 1 further characterized with respect to step (c) in that said second separation zone is operated at a temperature of from about 100° to about 150° F. and at a pressure of from about 275 to about 425 psig.

4. The process of claim 1 further characterized with respect to step (e) in that said third separation zone is a stabilizer column operated at a pressure of from about 275 to about 350 psig and at a bottom temperature in the range of from about 175° to about 275° F.

5. The process of claim 1 further characterized with respect to step (g) in that said refrigerated fourth separation zone is operated at a temperature of from about −40° to about 50° F., and at a pressure of from about 250 to about 325 psig.

6. The process of claim 1 further characterized with respect to step (h) in that said fifth separation zone is a stripper column operated at a pressure of from about 300 to about 375 psig, and at bottom temperature in the range of from about 175° to about 225° F.

* * * * *